D. S. DYSON.
Combination Tool.

No. 209,803.  Patented Nov. 12, 1878.

UNITED STATES PATENT OFFICE.

DUNBAR S. DYSON, OF BLOOMINGTON, ILLINOIS.

IMPROVEMENT IN COMBINATION-TOOLS.

Specification forming part of Letters Patent No. 209,803, dated November 12, 1878; application filed September 11, 1878.

*To all whom it may concern:*

Be it known that I, DUNBAR S. DYSON, of Bloomington, in the county of McLean, and in the State of Illinois, have invented certain new and useful Improvements in Compound Implements or Tools; and do hereby declare that the following is a full, clear, and exact description thereof, reference being had to the accompanying drawing, and to the letters of reference marked thereon, making a part of this specification, and in which—

Figure 1:
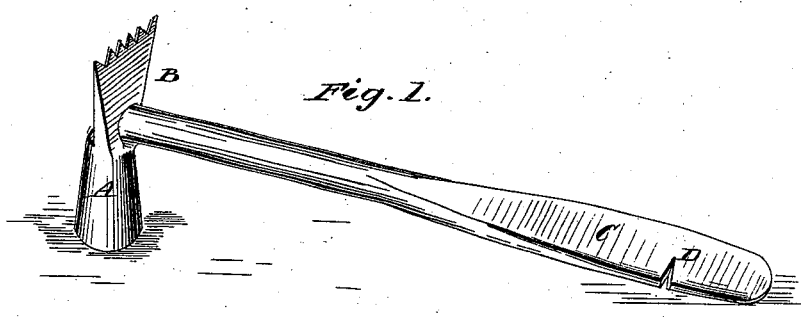
Figure 2:
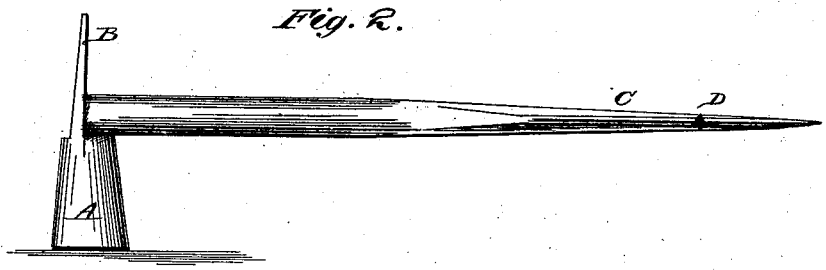

Figure 1 is a perspective view. Fig. 2 is a side view.

This invention relates to improvements in the class of compound implements or tools, and is more especially adapted for opening and closing cigar-boxes, drawing and driving the tacks or brads, and scraping off or removing the stamps thereon; and the invention consists in a compound implement or tool, as a new article of manufacture, consisting of a slotted and flat beveled handle, a hammer, and a toothed scraper, all as will be hereinafter fully described.

To enable others skilled in the art to make and use my invention, I will proceed to describe the same.

In the drawing, A represents a hammer, provided with a toothed or serrated scraper, B, in place of the usual claw, and a flat and beveled handle, C, provided with a transverse slot, D, on one side thereof.

The flat beveled handle is used to open the box, it being inserted as a wedge under the cover, when, by a slight twist of the handle, the cover will be raised. The tacks or brads are drawn by placing the handle so that the head of the tack is over the slot in said handle, when, by turning said handle, the tack will be easily and readily drawn.

The hammer is used to drive the tacks or brads in closing up a box, and the toothed or serrated scraper is used for scraping off or removing the stamps on the boxes.

It will be observed that the implement or tool is formed in one piece.

I claim as my invention—

As a new article of manufacture, the herein-described compound implement or tool, consisting of the slotted and flat beveled handle, the hammer, and toothed or serrated scraper, substantially as and for the purposes specified.

In testimony that I claim the foregoing I have hereunto set my hand this 3d day of September, 1878.

DUNBAR S. DYSON.

Witnesses:
 THOS. SLADE,
 H. E. HADLEY.